US 7,715,646 B2

(12) United States Patent
Johnson

(10) Patent No.: US 7,715,646 B2
(45) Date of Patent: May 11, 2010

(54) UNIFIED VISUAL MEASUREMENT OF BLUR AND NOISE DISTORTIONS IN DIGITAL IMAGES

(75) Inventor: Jeffrey Paul Johnson, Lawrenceville, NJ (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 1039 days.

(21) Appl. No.: 11/374,551

(22) Filed: Mar. 13, 2006

(65) Prior Publication Data

US 2006/0215893 A1 Sep. 28, 2006

Related U.S. Application Data

(60) Provisional application No. 60/665,229, filed on Mar. 25, 2005.

(51) Int. Cl.
*G06K 9/40* (2006.01)
*G06K 9/00* (2006.01)
(52) U.S. Cl. .................................... 382/260; 382/128
(58) Field of Classification Search ............... 382/128, 382/162, 166, 167, 236, 254, 260–269, 217–219, 382/138
See application file for complete search history.

(56) References Cited

U.S. PATENT DOCUMENTS

| 6,137,904 | A | * | 10/2000 | Lubin et al. | ................ 382/162 |
| 6,654,504 | B2 | * | 11/2003 | Lubin et al. | ................ 382/254 |
| 2003/0011679 | A1 | | 1/2003 | Jung et al. | |

FOREIGN PATENT DOCUMENTS

EP 1100278 5/2006

WO WO99/43161 8/1999

OTHER PUBLICATIONS

Jeffrey Lubin, Michael H. Brill, Roger L. Crane, Ph.DS From David Sarnoff Research Center: "Vision Model—Based Assessment of distortion magnitudes in digital video" Paper Presented at Iab Made to Measure Technical Seminar, [Online] 1996, XP002395516 Montreux, Switzerl and Retrieved from the Internet: URL: http://www.mpeg. org/MPEG/JND/> [retrieved on Aug. 21, 2006] the whole document.
Zhou Wang, Hamid R.Sheikh, Alan C. Bovik: "Objective Video quality Assessment" Handbook of Video Databases : Design and Applications, CRC Press, No. chapter41, Sep. 2003, pp. 1041-1078, XP002395517 the whole document.
Chun.Hsien Chou, Yun-Chin Li: "a perceptually tuned subband image coder based on the measure of just—noticeable—distortion profile" IEEE Transactions on Circutts and Systems for Video Technology, vol. 5, No. 6, Dec. 1995, XP002395518 the whole document.

* cited by examiner

*Primary Examiner*—Yon Couso
(74) *Attorney, Agent, or Firm*—Donald B. Paschburg; F. Chau & Associates, LLC

(57) ABSTRACT

A system and method are provided for unified visual measurement of blur and noise distortions in digital image data, the system including a processor, an input adapter in signal communication with the processor for receiving digital image data, a visual discrimination model (VDM) simulation unit in signal communication with the processor, a just noticeable difference (JND) analysis unit in signal communication with the processor, and a JND selection unit in signal communication with the processor; and the method including receiving digital image data, simulating a single-ended VDM, analyzing individual JND channels, including the responses of the highest spatial frequency channel(s), and selecting a reference JND level corresponding to low noise and blur distortions.

20 Claims, 8 Drawing Sheets

UNIFIED VISUAL MEASUREMENT OF BLUR AND NOISE DISTORTIONS IN DIGITAL IMAGES

CROSS-REFERENCE TO RELATED APPLICATION

This application claims the benefit of U.S. Provisional Application Ser. No. 60/665,229, filed Mar. 25, 2005 and entitled "Unified Visual Metric for Blur and Noise Distortions in Digital Images", which is incorporated herein by reference in its entirety.

BACKGROUND

Conventional methods for computing metrics of image distortion rely on the availability of a high-quality version of a given image with low or no distortion for reference. These metrics can be computed from differences in pixel values, such as mean-squared error (MSE) or peak signal-to-noise ratio (PSRN), or in simulations of the visual conspicuity of those differences, such as from a just-noticeable difference (JND) output of a visual discrimination model (VDM).

Simple pixel-difference metrics, such as PSNR, are often less sensitive to distortions due to blur than to noise, and can underestimate the impact of blur on subjective assessments of image quality. JND-based visual metrics have been found to correlate better with observer ratings of image degradation due to both blur and noise in cases where both types of distortions can be related to an "ideal" reference image without significant distortion.

Unfortunately, prior methods have not discriminated the effects of blur and noise on JND metrics. This capability would be desirable when the imaging methods and parameters to be evaluated produce fundamental tradeoffs between blur and noise, such as in single-shot fast spin echo (HASTE) image reconstruction. In addition, high-quality reference images are often not available for evaluating levels of image distortion. In these cases, an alternate method is desired.

SUMMARY

These and other drawbacks and disadvantages of the prior art are addressed by an exemplary system and method for unified visual measurement of blur and noise distortions in digital images.

An exemplary system is provided for unified visual measurement of blur and noise distortions in digital image data, the system including a processor, an input adapter in signal communication with the processor for receiving digital image data, a visual discrimination model (VDM) simulation unit in signal communication with the processor, a just noticeable difference (JND) analysis unit in signal communication with the processor, and a JND selection unit in signal communication with the processor.

An exemplary method is provided for unified visual measurement of blur and noise distortions in digital image data, the method including receiving digital image data, simulating a single-ended VDM, analyzing individual JND channels, including the responses of the highest spatial frequency channel(s), and selecting a reference JND level corresponding to low noise and blur distortions.

These and other aspects, features and advantages of the present disclosure will become apparent from the following description of exemplary embodiments, which is to be read in connection with the accompanying drawings.

BRIEF DESCRIPTION OF THE DRAWINGS

The present disclosure teaches a system and method for unified visual measurement of blur and noise distortions in digital images in accordance with the following exemplary figures, in which.

DETAILED DESCRIPTION OF PREFERRED EMBODIMENTS

An exemplary embodiment of the present disclosure applies to the analysis of cardiac magnetic-resonance images acquired by single-shot fast spin echo (HASTE) methods. This embodiment demonstrates the utility of the disclosed visual image-quality metrics (VIQM) in the evaluation of accelerated magnetic resonance (MR) imaging methods.

Figure 1:
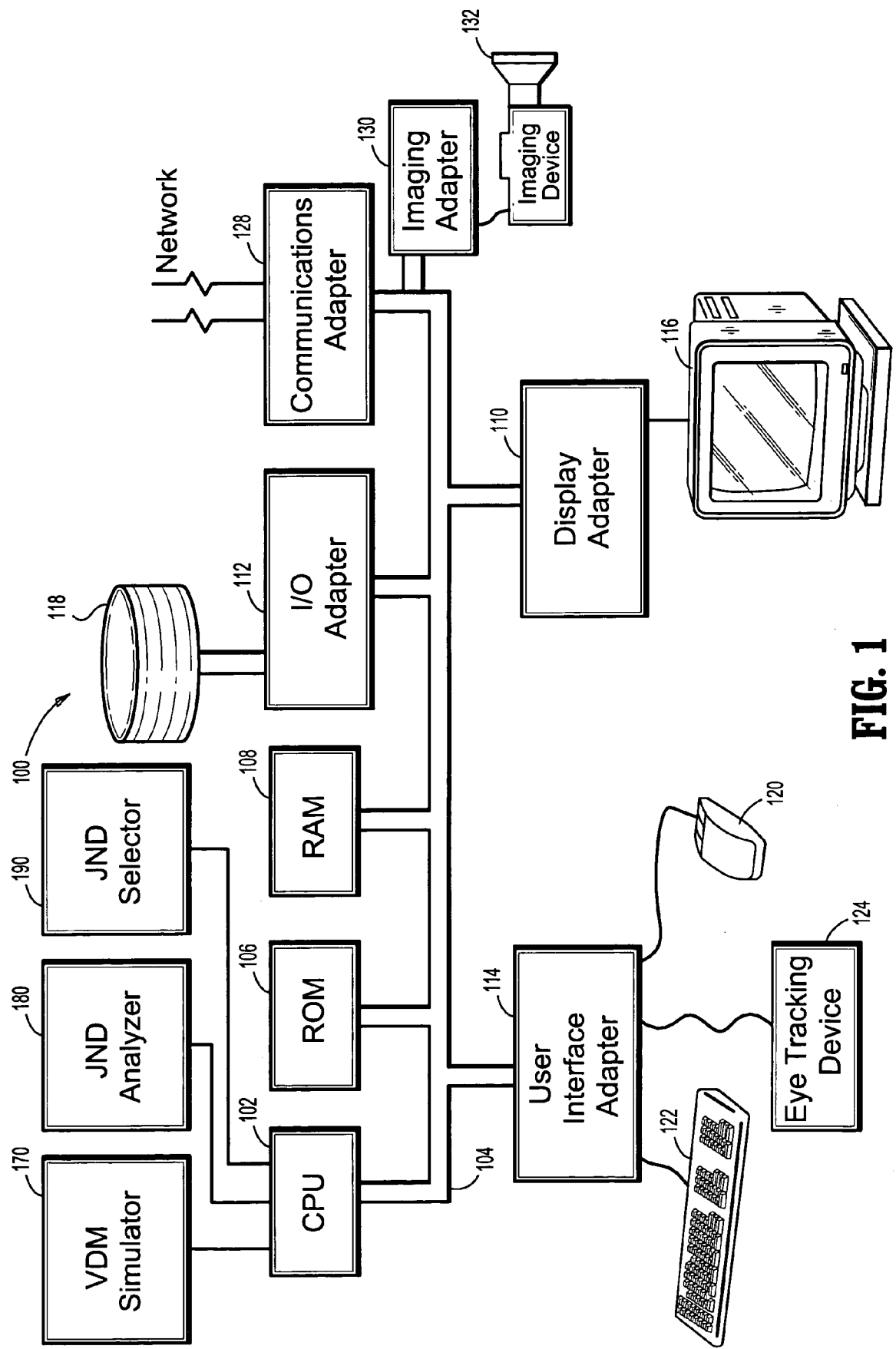
FIG. 1 shows a schematic diagram of a system for unified visual measurement of blur and noise distortions in digital images in accordance with an illustrative embodiment of the present disclosure.

As shown in FIG. 1, a system for unified visual measurement of blur and noise distortions in digital images, according to an illustrative embodiment of the present disclosure, is indicated generally by the reference numeral 100. The system 100 includes at least one processor or central processing unit (CPU) 102 in signal communication with a system bus 104. A read only memory (ROM) 106, a random access memory (RAM) 108, a display adapter 110, an I/O adapter 112, a user interface adapter 114, a communications adapter 128, and an imaging adapter 130 are also in signal communication with the system bus 104. A display unit 116 is in signal communication with the system bus 104 via the display adapter 110. A disk storage unit 118, such as, for example, a magnetic or optical disk storage unit is in signal communication with the system bus 104 via the I/O adapter 112. A mouse 120, a keyboard 122, and an eye tracking device 124 are in signal communication with the system bus 104 via the user interface adapter 114. An imaging device 132 is in signal communication with the system bus 104 via the imaging adapter 130.

A VDM simulation unit 170, a JND analysis unit 180 and a JND selection unit 190 are also included in the system 100 and in signal communication with the CPU 102 and the system bus 104. While the VDM simulation unit 170, the JND analysis unit 180 and the JND selection unit 190 are illustrated as coupled to the at least one processor or CPU 102, these components are preferably embodied in computer program code stored in, at least one of the memories 106, 108 and 118, wherein the computer program code is executed by the CPU 102.

In alternate embodiments of the apparatus 100, some or all of the computer program code may be stored in registers located on the processor chip 102. In addition, various alternate configurations and implementations of the VDM simulation unit 170, the JND analysis unit 180 and the JND selection unit 190 may be made, as well as of the other elements of the system 100.

Figure 2:
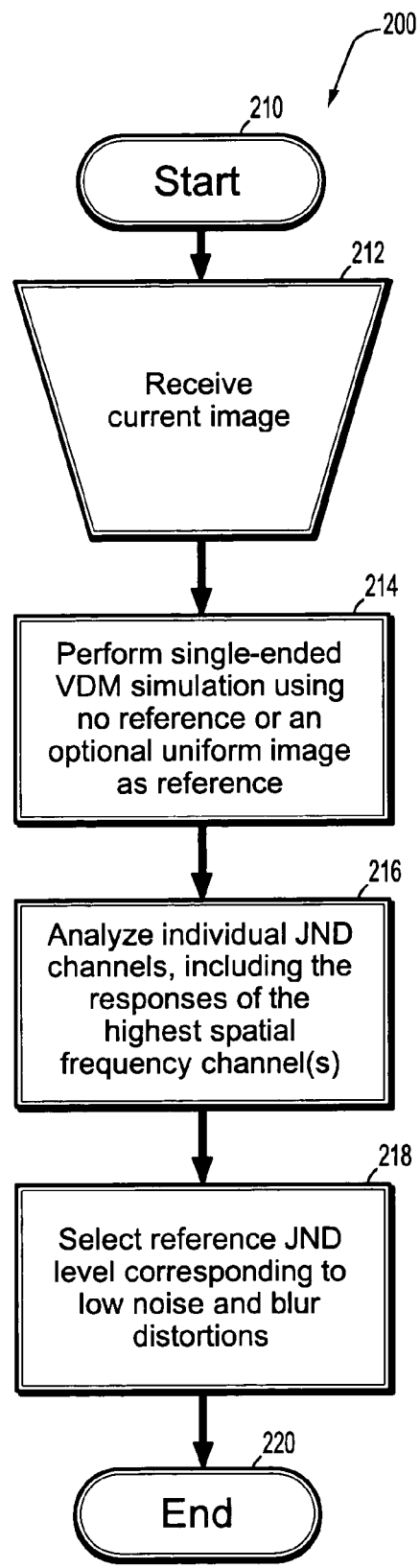
FIG. 2 shows a flow diagram of a method for unified visual measurement of blur and noise distortions in digital images in accordance with an illustrative embodiment of the present disclosure.

Turning to FIG. 2, a method for unified visual measurement of blur and noise distortions in digital images is indicated generally by the reference numeral 200. The method includes a start block 210 that passes control to a first input block 212. The first input block 212 receives a current input image, and passes control to a function block 214. The function block 214 performs a single-ended VDM simulation, in which an optional uniform image may be used as a reference. No reference is required. The function block 214, in turn, passes control to a function block 216, which performs an analysis of individual JND channels, including the responses of the highest spatial frequency channel(s). The function block 216 passes control to a function block 218, which selects a reference JND level corresponding to low noise and blur distortions. The function block 218, in turn, passes control to an end block 220.

Figure 3:
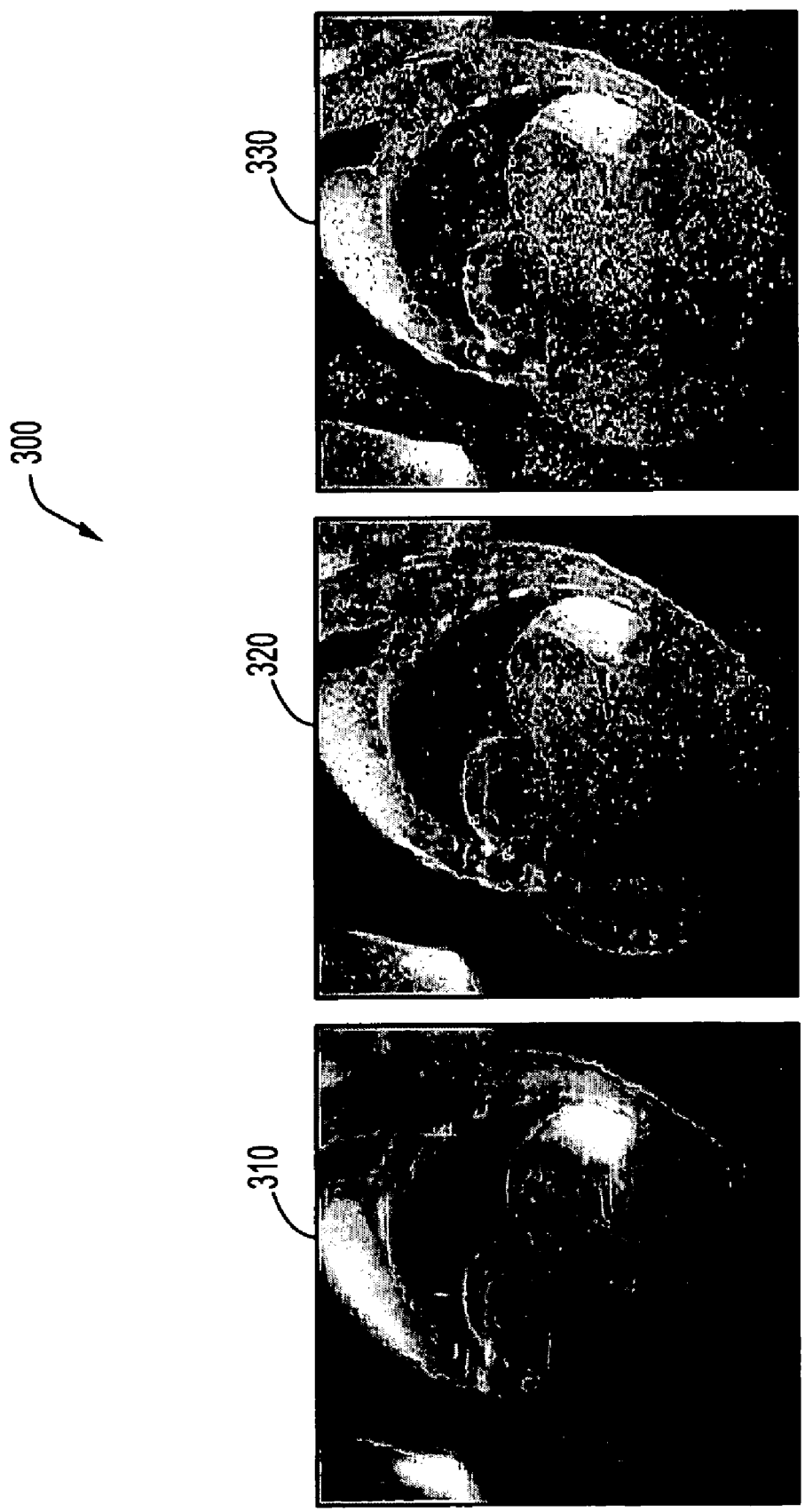
FIG. 3 shows a graphical diagram of cardiac magnetic resonance (MR) images reconstructed from the same single-shot fast spin echo (HASTE) dataset in accordance with an illustrative embodiment of the present disclosure.

Turning now to FIG. 3, a comparative graphical diagram of cardiac magnetic resonance (MR) images, reconstructed from the same single-shot fast spin echo (HASTE) dataset using three different algorithms, is indicated generally by the reference numeral 300. A no-ppa image 310, obtained without using partial parallel acquisition ("ppa"), is produced here with no acceleration. One type of ppa is Generalized Autocalibrating Partially Parallel Acquisitions (GRAPPA). A GRAPPA image 320 is produced here with 3× acceleration. A reconstruction method used for fast magnetic resonance imaging (MRI) is Modified Sensitivity Encoding (mSENSE). An mSENSE image 330 is also produced here with 3× acceleration. The image 310 has more blurring than the image 320, while the image 330 has more noise than the image 320.

Figure 4:
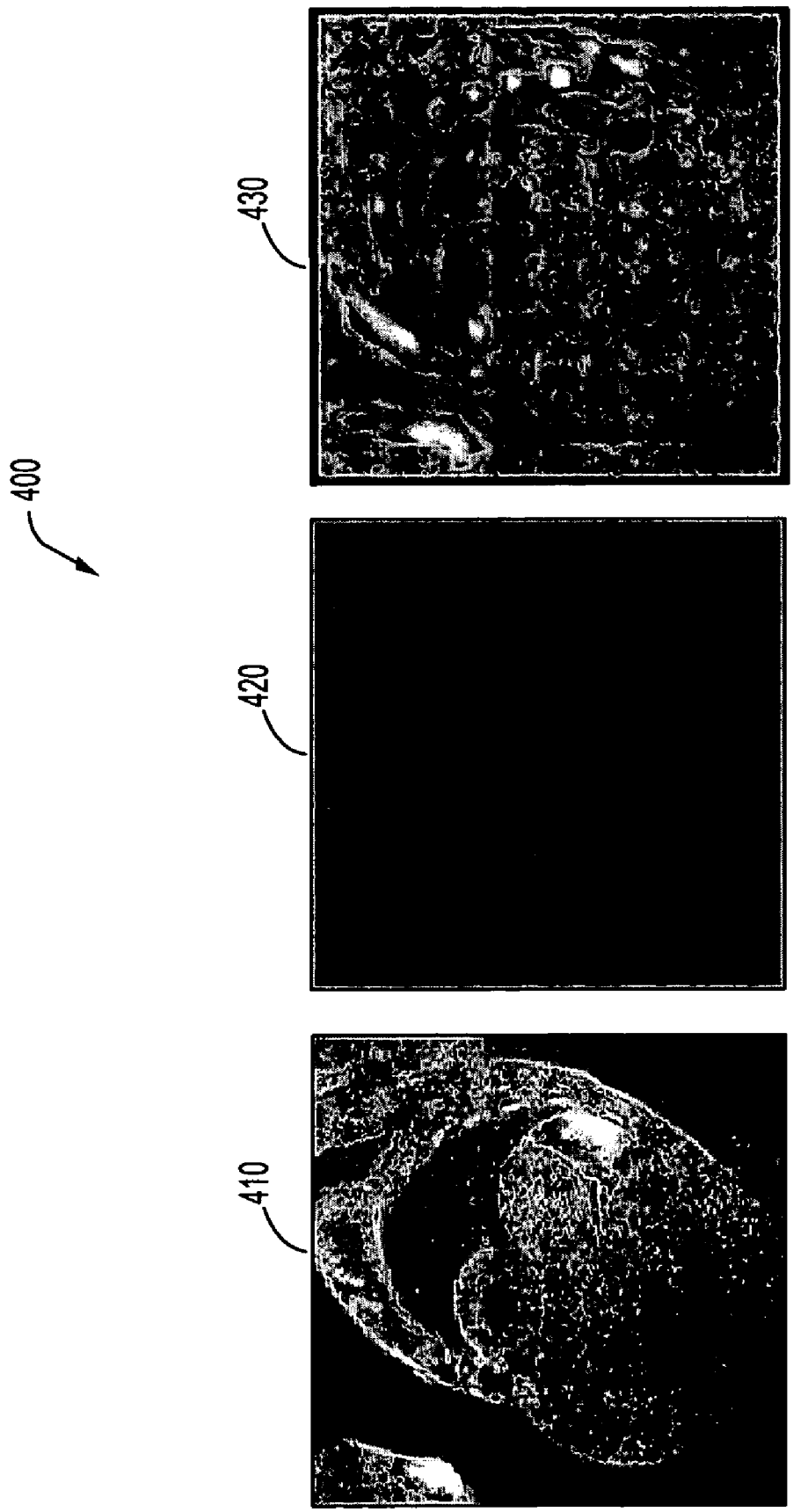
FIG. 4 shows a graphical diagram of exemplary single-ended VDM input images and the resulting composite JND map in accordance with an illustrative embodiment of the present disclosure.

As shown in FIG. 4, a graphical diagram of exemplary single-ended VDM input images is indicated generally by the reference numeral 400. An image 410 is a GRAPPA 3× test image, an image 420 is an optional uniform mean reference image, and an image 430 is the resulting composite JND map produced by a visual discrimination model (VDM) for this pair of input images.

Figure 5:
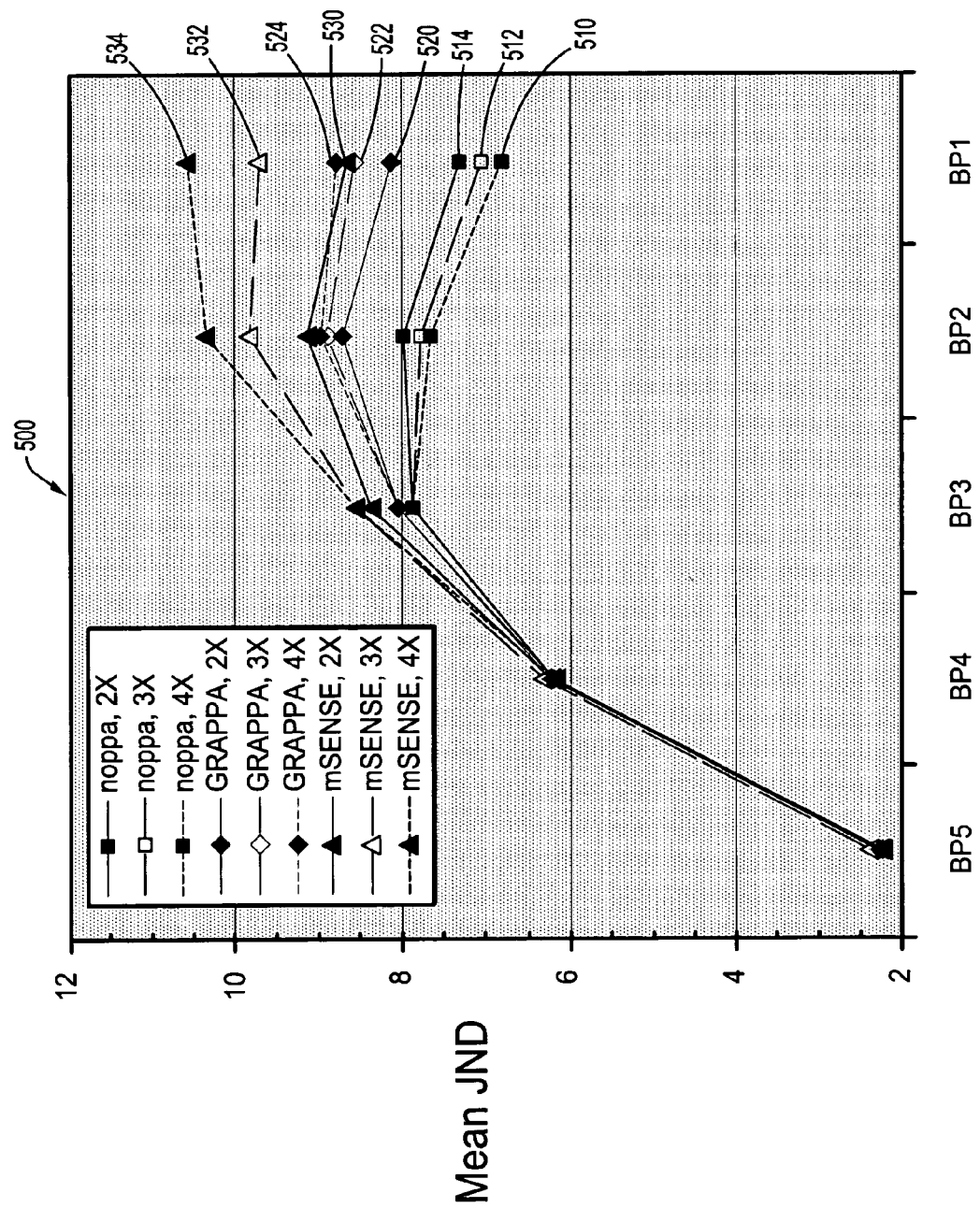
FIG. 5 shows a graphical diagram of mean JNDs for spatial frequency channels in single-ended VDM simulations for HASTE images reconstructed with artifacts in accordance with an illustrative embodiment of the present disclosure.

Turning to FIG. 5, a graphical diagram of mean JNDs for spatial frequency channels in single-ended VDM simulations for HASTE images with blur and noise artifacts is indicated generally by the reference numeral 500. Here, the mean JND plot 510 is reconstructed with blur using no-ppa with 2× acceleration. The mean JND plot 512 is reconstructed with blur using no-ppa with 3× acceleration. The mean JND plot 514 is reconstructed with blur using no-ppa with 4× acceleration. The mean JND plot 520 is reconstructed with noise using GRAPPA with 2× acceleration. The mean JND plot 522 is reconstructed with noise using GRAPPA with 3× acceleration. The mean JND plot 524 is reconstructed with noise using GRAPPA with 4× acceleration. The mean JND plot 530 is reconstructed with noise using mSENSE with 2× acceleration. The mean JND plot 532 is reconstructed with noise using mSENSE with 3× acceleration. The mean JND plot 534 is reconstructed with noise using mSENSE with 4× acceleration.

Figures 6A, 6B:
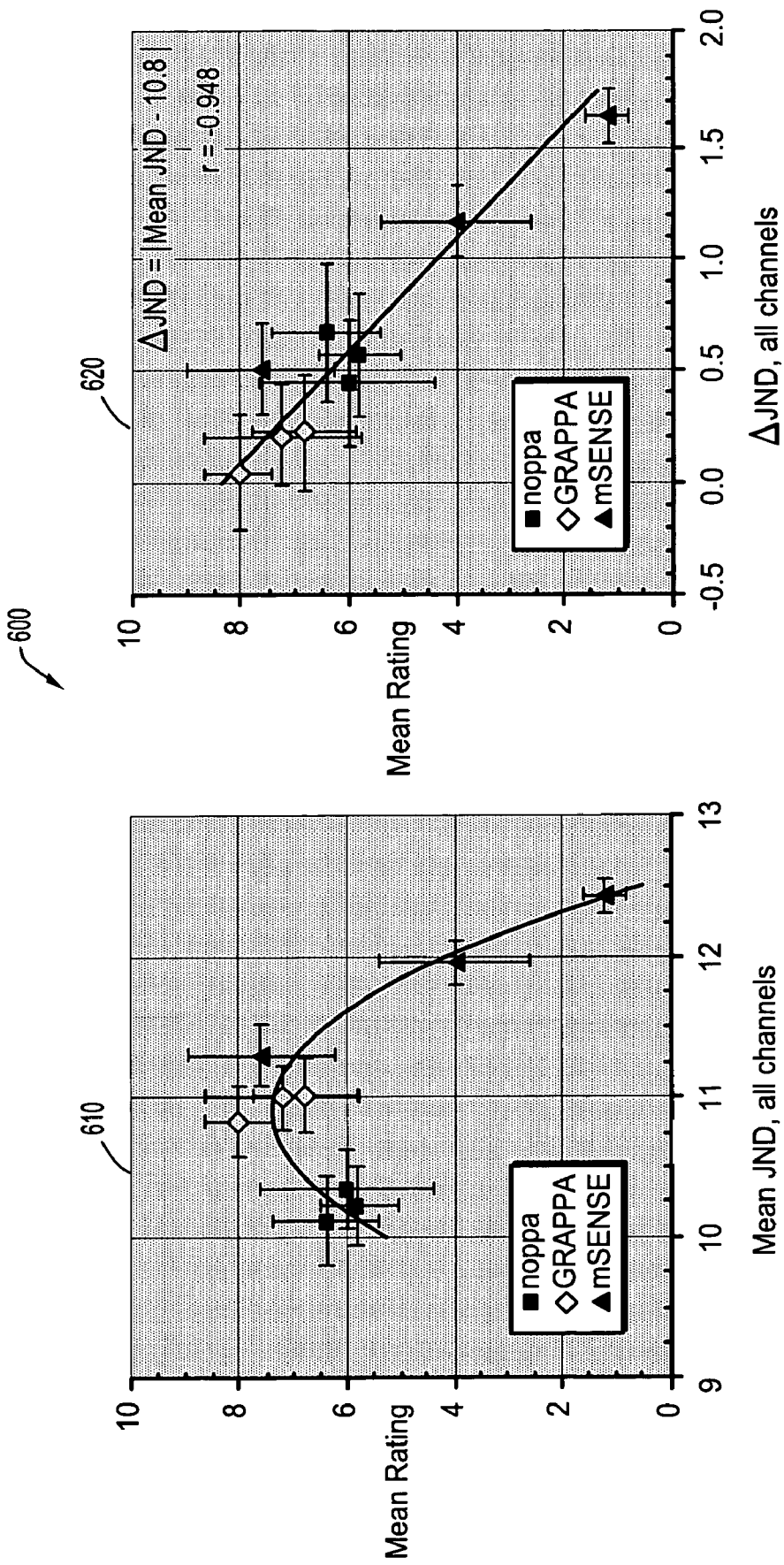
FIG. 6 shows a graphical diagram for correlation of observer image-quality ratings and mean JNDs using single-ended simulation on all channels for reconstructed cardiac MR images in accordance with an illustrative embodiment of the present disclosure.

Turning now to FIG. 6, a graphical diagram for correlation of observer image-quality ratings and mean JNDs using single-ended simulation on all channels for reconstructed cardiac MR images is indicated generally by the reference numeral 600. Here, a plot 610 shows raw JNDs, and a plot 620 shows absolute differences in JND from a reference level of 10.8.

Figure 7A:
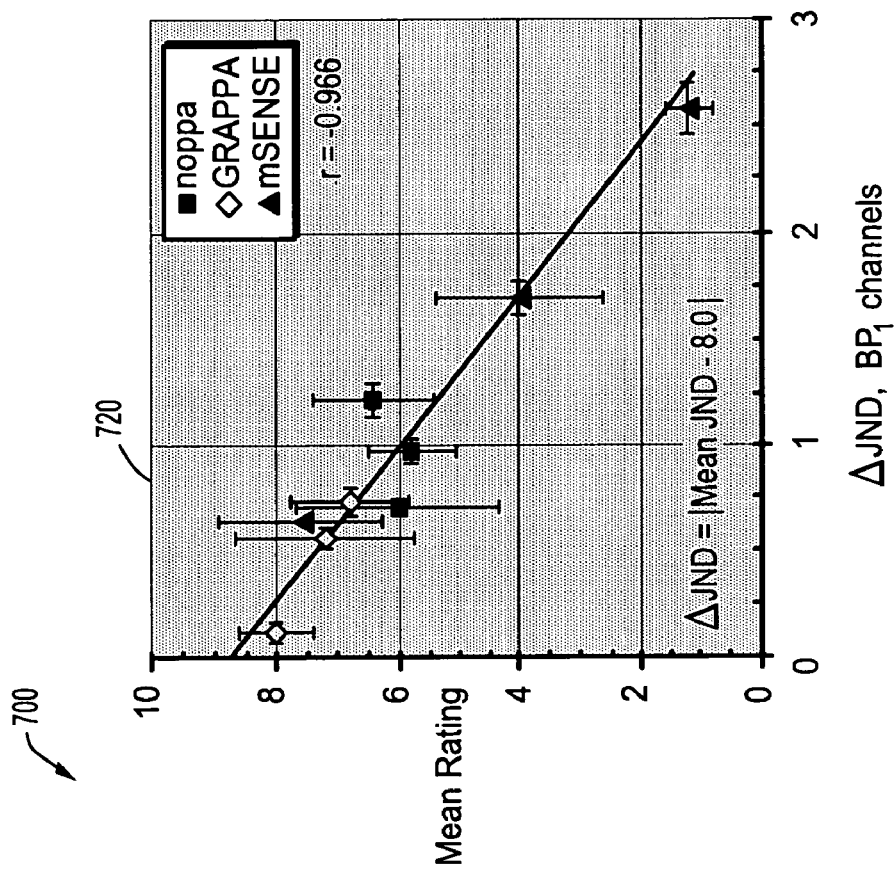
FIG. 7 shows a graphical diagram for correlation of observer image-quality ratings and mean JNDs using single-ended simulation for the highest spatial frequency channel in accordance with an illustrative embodiment of the present disclosure.
Figure 7B:
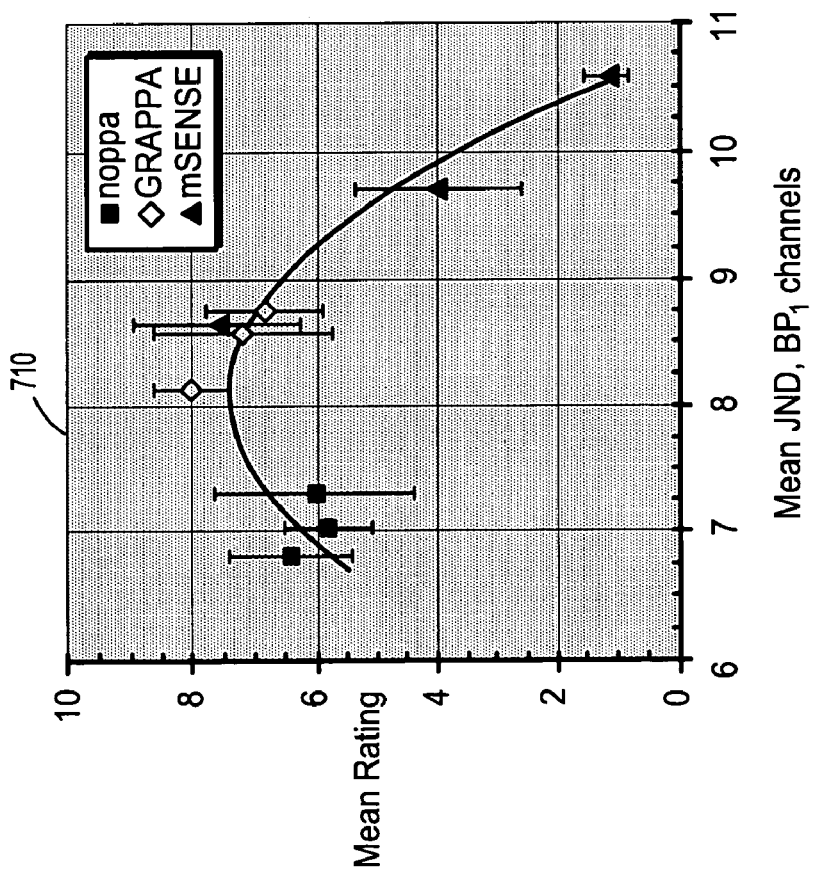

As shown in FIG. 7, a graphical diagram for correlation of observer image-quality ratings and mean JNDs is indicated generally by the reference numeral 700. This diagram uses single-ended simulation for the highest spatial frequency channel (BP1). A plot 710 shows raw JNDs, and a plot 720 shows absolute differences in JND from a reference level of 8.0.

Figures 8A, 8B:
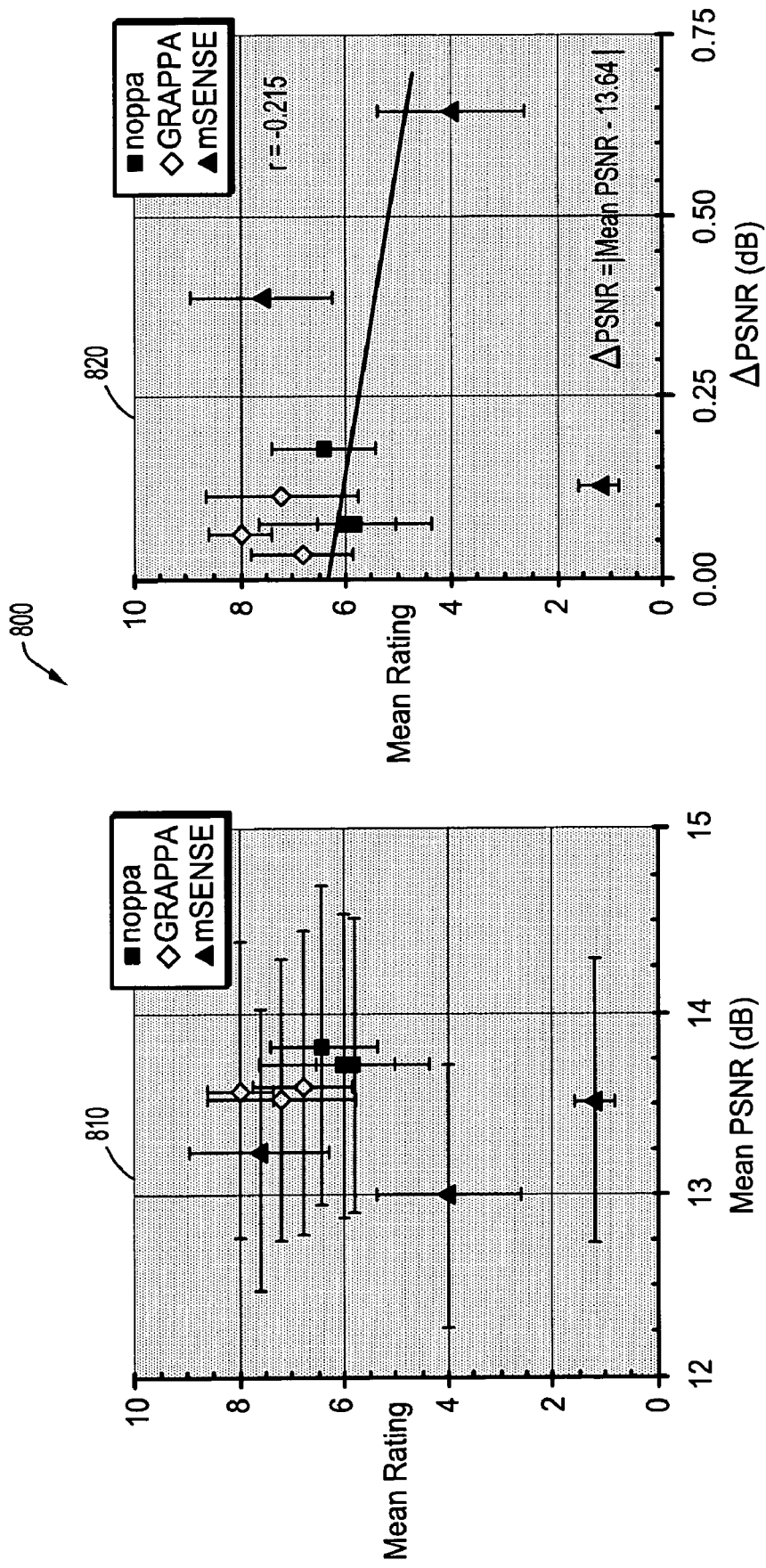
FIG. 8 shows a graphical diagram for correlation of observer image-quality ratings and PSNR relative to mean reference for reconstructed cardiac MR images in accordance with an illustrative embodiment of the present disclosure.

Turning to FIG. 8, a graphical diagram for correlation of observer image-quality ratings and PSNR relative to mean reference for reconstructed cardiac MR images is indicated generally by the reference numeral 800. Here, a plot 810 shows raw PSNR, and a plot 820 shows absolute differences in PSNR from a reference level of 13.64.

Thus, several series of HASTE cardiac images were generated using GRAPPA and mSENSE partial parallel acquisition (ppa) techniques with acceleration factors of 2, 3, and 4. These images were compared to images reconstructed without acceleration (no-ppa). The no-ppa images had significant blurring due to longer shot time and T2 decay. The GRAPPA and mSENSE images appeared less blurred but had significant levels of noise artifacts that increased with acceleration factor and were more noticeable for the mSENSE images. See FIG. 3.

For practical reasons in image acquisition and reconstruction, high-quality reference images are often not available for evaluating levels of image distortion. In these cases, an alternate method is provided by the present disclosure. This approach offers two significant advantages over previous techniques. First, high-quality reference images are not required, and second, the effects of blur and noise on subjective image quality are discriminable. This enables tradeoffs between blur and noise to be quantified and optimized.

The present disclosure describes a unified method and superior metric for evaluating distortions due to both blur and noise in digital images without requiring high-quality reference images. The superior metric for both blurs and noise distortions in digital images is based on Just-Noticeable Difference (JND) modeling of distortion visibility. Metrics produced by this method are shown to be highly correlated with expert observer ratings of image quality. Such metrics may be used in any digital imaging system to assess and control the visibility of distortions, and are especially useful in applications where tradeoffs between blur and noise must be optimized and/or in the absence of reference images that have no distortions.

Referring back to FIGS. 1 and 2, the VDM simulation unit 170 performs the single-ended VDM simulation 214 in which an optional uniform image may serve as a reference. A reference is not required. The JND analysis unit 180 performs the analysis 216 of individual JND channels, including the responses of the highest spatial frequency channel(s). The JND selection unit 190 performs the selection 218 of a reference JND level corresponding to low noise and blur distortions.

Referring back to FIG. 4, single-ended VDM simulations involve the comparison of a given test image to an optional uniform reference image with constant value determined typically by the mean pixel value or luminance of the test image. The output of this simulation is a measure of the inherent contrast energy, converted to JNDs, of the test image as a function of spatial frequency and orientation. An example of input images and output composite JND map, evaluated from the maximum responses across all channels in the VDM, is provided in FIG. 4. The full VDM output includes a set of 2D JND maps, one for each spatial frequency and orientation channel in the model. Each of these channel maps can be reduced to a scalar value, typically a mean or maximum over the full image area or within a specified region of interest.

Referring back to FIG. 5, application of the VDM to test images with various levels of blur or noise demonstrates that the primary effects of these distortions are on the responses of the higher spatial frequency channels. Typically, the effect of blur is to reduce JND levels in those channels, while noise increases the JND levels. These effects are illustrated in FIG. 5 for a set of HASTE images corresponding to three reconstruction methods (no-ppa, GRAPPA, and mSENSE) and three acceleration factors (2, 3, and 4), averaged across five slice locations in the heart. Mean channel JNDs are plotted in this figure for each spatial frequency band (5-lowest to 1-highest). While the nine reconstruction conditions produced single-ended channel JNDs that were nearly indistinguishable at the two lowest spatial frequencies, the differences among these conditions increased steadily with increasing spatial frequency. For the noisy GRAPPA and mSENSE images, there was a shift in channel responses from middle to higher spatial frequency channels with increasing acceleration factor. For the blurred no-ppa images, the dominant channel response was in the mid-frequency range, and the responses of higher spatial frequency channels were significantly lower than for the GRAPPA and mSENSE images.

Referring back to FIG. 6, distortion metrics are useful to the extent that they correlate with observer ratings of image quality. All of the cardiac MR images in this study were rated for overall image quality by an expert observer on a scale from 0 (unusable) to 10 (excellent). The images were viewed and rated one at a time in blinded, random sequence on a high-quality LCD monitor. Quality ratings and corresponding metrics, JND and PSNR, for the same images were averaged across the five slice locations for each of the nine reconstruction conditions. Mean ratings are plotted in 610 of FIG. 6 as a function of mean JND in the composite maps for all channels. The overall correlation with is observer ratings across all three reconstruction methods was rather low ($r=-0.663$), since both blur and noise conditions tended to lower the quality ratings, while the JND metrics for these distortions were significantly lower for blur than for noise. This correlation was improved significantly ($r=-0.948$), however, by plotting the absolute difference between the mean JNDs and a "reference" JND level, near 10.8 in this case, as shown in 620 of FIG. 6.

Referring back to FIG. 7, the reference JND level for single-ended simulations approximates the VDM response to an "ideal" image without blur or noise. Values above the reference level correspond to the introduction of high-frequency noise contrast, while values below the reference correspond to a loss of image contrast due to blur. The separation between these effects is greatest for the highest spatial frequency channel (BP1). Consequently, it is preferable to consider independently the mean JNDs for BP1, as shown in 710 of FIG. 7. This is supported by the increased correlation ($r=-0.966$) evident in 720 of FIG. 7 for the delta or DJND (BP1) values with a reference level of 8.0 JNDs.

Referring back to FIG. 8, the advantages of JND distortion metrics over pixel-difference-based metrics, such as PSNR, are evident in the plots 810 and 820. Variations in single-ended PSNR among images for a single reconstruction condition are generally much larger than the differences among mean values across conditions. The error bars represent standard deviations in FIG. 8. When the strategy of computing absolute differences from a reference value is applied to PSNR, the best correlation that could be obtained with observer ratings was relatively low ($r=-0.215$ in the plot 820). For single-ended PSNR calculations, higher image blur increases PSNR since the blurred image looks more like the optional uniform mean reference. Noise distortion tends to lower the PSNR for both single-ended evaluations and conventional comparisons of two similar images. In principle, it may be possible to define a reference PSNR level from which any deviation, up or down, corresponds to a perceived loss in image quality. However, such an approach did not produce a reliable indicator of image-quality ratings for the reconstructed cardiac MR images. For any given distortion metric, the optimal reference level defined above can be determined by univariate minimization of the correlation coefficient (ideally$=-1$) for observer ratings as a function of the absolute differences between the chosen metric and reference level.

Alternate embodiments of the methods described above may be necessary for individual images that have significant levels of both blur and noise. In these cases, JND metrics for a single channel might overlap near the reference level associated above with an ideal blurless, noiseless image. To separate the effects of noise and blur for these images, the trends in JND channel responses evident in FIG. 5 may be used to define characteristic features for the two types of distortions. For example, features for classifying predominantly blurred or noisy images may be computed from the observed shift in dominant channel JNDs from mid to high frequency channels for the noisy images and the opposite shift toward mid-range channels for the blurred images.

In summary, embodiments of the present disclosure provide a technique for applying single-ended VDM simulations to quantify levels of blur and noise distortion and produce metrics that correlate highly with observer ratings of image quality for both types of distortion. This technique is especially useful in evaluating and optimizing the tradeoffs inherent in fast MR imaging methods between blurs and noise artifacts.

It is to be understood that the teachings of the present disclosure may be implemented in various forms of hardware, software, firmware, special purpose processors, or combinations thereof. Most preferably, the teachings of the present disclosure are implemented as a combination of hardware and software.

Moreover, the software is preferably implemented as an application program tangibly embodied on a program storage unit. The application program may be uploaded to, and executed by, a machine comprising any suitable architecture. Preferably, the machine is implemented on a computer platform having hardware such as one or more central processing units (CPU), a random access memory (RAM), and input/output (I/O) interfaces.

The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

It is to be further understood that, because some of the constituent system components and methods depicted in the accompanying drawings are preferably implemented in software, the actual connections between the system components or the process function blocks may differ depending upon the manner in which the present disclosure is programmed. Given the teachings herein, one of ordinary skill in the pertinent art will be able to contemplate these and similar implementations or configurations of the present disclosure.

Although illustrative embodiments have been described herein with reference to the accompanying drawings, it is to be understood that the present disclosure is not limited to those precise embodiments, and that various changes and modifications may be effected therein by one of ordinary skill in the pertinent art without departing from the scope or spirit of the present disclosure. All such changes and modifications are intended to be included within the scope of the present disclosure as set forth in the appended claims.

What is claimed is:

1. A method for unified visual measurement of blur and noise distortions in digital image data, comprising:
   electronically receiving digital image data;
   electronically simulating a single-ended visual discrimination model (VDM);
   electronically analyzing individual just noticeable difference (JND) channels, including the responses of the highest spatial frequency channel(s); and
   electronically selecting a reference JND level corresponding to low noise and blur distortions.

2. A method as defined in claim 1, wherein the digital image data is subjected to partial parallel acquisition.

3. A method as defined in claim 2, wherein the partial parallel acquisition is at least one of Generalized Autocalibrating Partially Parallel Acquisitions (GRAPPA) or Modified Sensitivity Encoding (mSENSE).

4. A method as defined in claim 1, wherein the digital image data is subjected to acceleration.

5. A method as defined in claim 4, wherein the acceleration has a multiplication factor of 2, 3 or 4.

6. A method as defined in claim 1, wherein substantially all individual JND channels are analyzed.

7. A method as defined in claim 1, the VDM simulation using an optional uniform image data reference indicative of a uniform mean JND image.

8. A method as defined in claim 1, wherein the single-ended VDM simulation quantifies levels of both blur and noise distortion.

9. A method as defined in claim 1, wherein the single-ended VDM simulation produces a metric that correlates highly with observer ratings of image quality for both blur and noise distortion.

10. A method as defined in claim 1, wherein the single-ended VDM simulation and JND analysis are applied to evaluating and optimizing the tradeoffs between blur and noise artifacts inherent in fast magnetic resonance (MR) imaging.

11. A system for unified visual measurement of blur and noise distortions in digital image data, comprising:
    a processor;
    an input adapter in signal communication with the processor for receiving digital image data;
    a visual discrimination model (VDM) simulation unit in signal communication with the processor for simulating a single-ended VDM;
    a just noticeable difference (JND) analysis unit in signal communication with the processor; and
    a JND selection unit in signal communication with the processor.

12. A system as defined in claim 11, the VDM simulation unit comprising means for simulating a single-ended VDM using an optional uniform image as reference or no reference at all.

13. A system as defined in claim 11, the JND analysis unit comprising means for analyzing individual JND channels, including the responses of the highest spatial frequency channel(s).

14. A system as defined in claim 11, the JND selection unit comprising means for selecting a reference JND level corresponding to low noise and blur distortions.

15. A computer readable storage medium tangibly embodying a program of instructions executable by a computer to perform program steps for unified visual measurement of blur and noise distortions in digital image data, the program steps comprising:
    receiving digital image data;
    simulating a single-ended VDM;
    analyzing individual JND channels, including the responses of the highest spatial frequency channel(s); and
    selecting a reference JND level corresponding to low noise and blur distortions.

16. A program storage device as defined in claim 15, the program steps further comprising subjecting the digital image data to partial parallel acquisition.

17. A program storage device as defined in claim 15, the program steps further comprising subjecting the digital image data to acceleration.

18. A program storage device as defined in claim 15, the program steps further comprising computing a uniform mean JND image to use as an optional uniform image data reference.

19. A program storage device as defined in claim 15, the program steps further comprising quantifying levels of both blur and noise distortion in the single-ended VDM simulation.

20. A program storage device as defined in claim 15, the program steps further comprising evaluating and optimizing the tradeoffs between blur and noise artifacts inherent in fast magnetic resonance (MR) imaging.

* * * * *